United States Patent

Pearson

[15] 3,640,550
[45] Feb. 8, 1972

[54] HIDEAWAY TRAILER HITCH

[72] Inventor: Herbert Irvin Pearson, 303 Pineland Drive, Goldsboro, N.C. 27530

[22] Filed: May 25, 1970

[21] Appl. No.: 39,961

[52] U.S. Cl. ............................................. 280/491 B, 280/511
[51] Int. Cl. ................................................................ B60d 1/06
[58] Field of Search .............................. 280/491, 491 B, 499

[56] References Cited

UNITED STATES PATENTS

| | | | |
|---|---|---|---|
| 2,513,258 | 6/1950 | Ulrich | 280/491 B |
| 2,531,859 | 11/1950 | Mock | 280/491 B |
| 2,717,164 | 9/1955 | Meyer | 280/491 B |
| 3,243,200 | 3/1966 | Roenfeldt | 280/499 X |

Primary Examiner—Leo Friaglia

[57] ABSTRACT

A trailer hitch secureable to a rear part of an automobile, the hitch including a tongue which extends rearwardly into an exposed position when in use, and which is pivotable into a hidden position when not in use, thereby not detracting from the appearance of the automobile.

3 Claims, 8 Drawing Figures

PATENTED FEB 8 1972 3,640,550
SHEET 1 OF 2
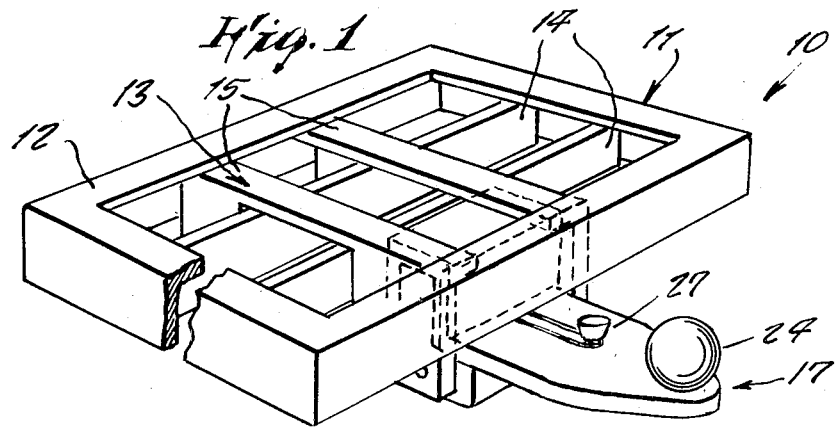
Fig. 1
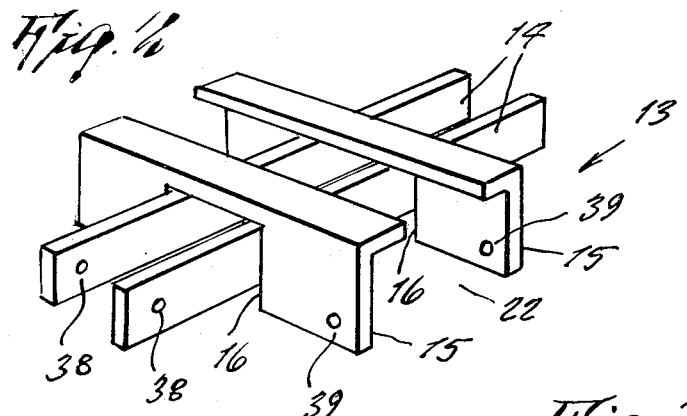
Fig. 2
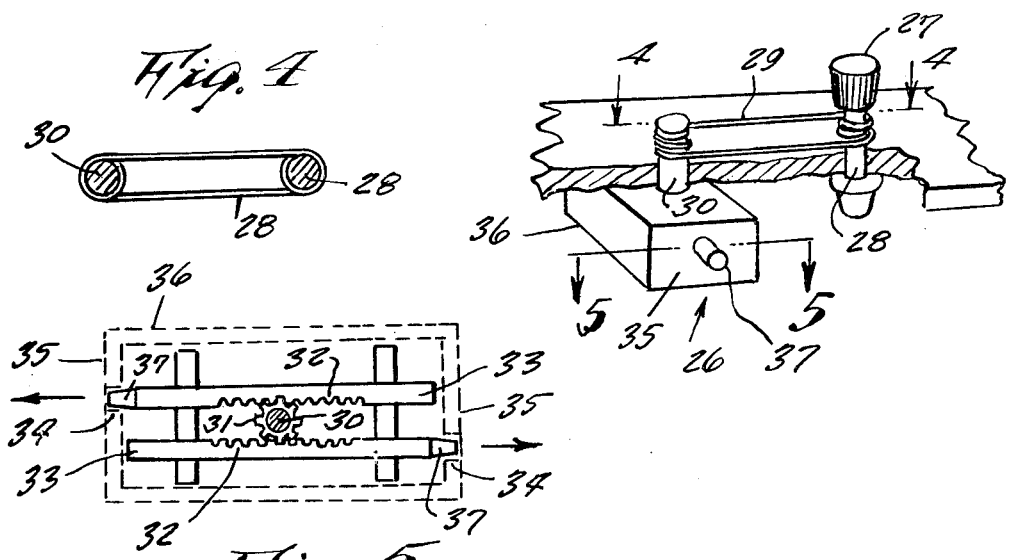
Fig. 3
Fig. 4
Fig. 5
INVENTOR
HERBERT I. PEARSON

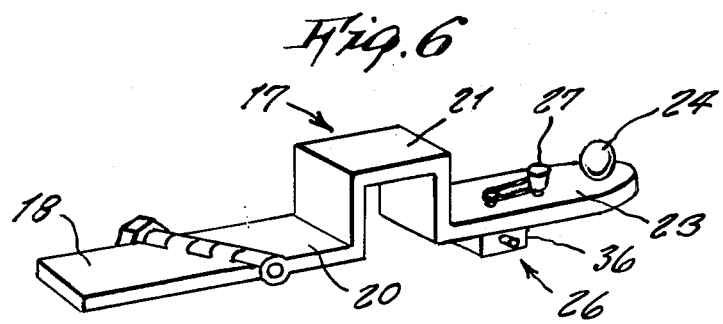
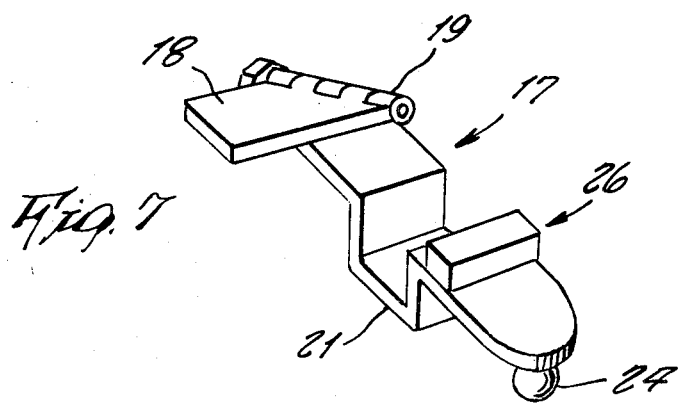
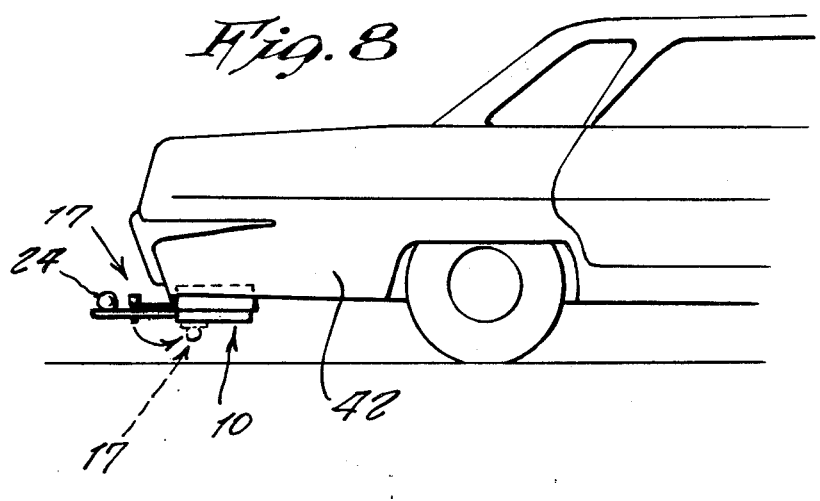

HIDEAWAY TRAILER HITCH

This invention relates generally to trailer hitches.

A principal object of the present invention is to provide a trailer hitch for an automotive vehicle, the trailer hitch having self-contained means for being retracted into a hidden, out of the way position when not in operative use.

Another object of the present invention is to provide a trailer hitch which includes a tongue which is pivotable between a rearward extending direction and a sidewardly direction, the latter direction being maintained while the device is not in use.

Other objects of the present invention are to provide a hideaway trailer hitch for automotive vehicles which is simple in design, inexpensive to manufacture, rugged in construction, easy to use and efficient in operation.

These and other objects will be readily evident upon a study of the following specification and the accompanying drawings wherein:

FIG. 1 is a perspective view of the present invention,

FIG. 2 a perspective view of an intercross unit forming a component thereof,

FIG. 3 is a fragmentary perspective view of a locking control mechanism,

FIG. 4 is a cross-sectional view in the direction 4—4 of FIG. 3, and

FIG. 5 is a cross-sectional view in the direction 5—5 of FIG. 3.

FIG. 6 is a perspective view of the tongue shown in one position,

FIG. 7 is a perspective view of the tongue shown pivoted into an alternate position, and FIG. 8 is a side elevation view of an automotive vehicle showing the invention secured thereto.

Referring now to the drawings in detail, the reference numeral 10 represents a hideaway trailer hitch according to the present invention wherein there is a supporting frame unit II comprised of a rectangular frame 12 and an intercross 13.

The frame 12 is made of angle configurated material which extends around the four sides thereof, the intercross 13 is comprised of a pair of parallel bars 14 which cross a pair of parallel angle irons 15.

Each of the angle irons 15 is provided with a U-shaped central notch 16, within which the bars 14 extend. The intercross is fitted within the frame, as shown in FIG. 1 of the drawing.

A tongue 17, shown in FIGS. 6 and 7, is supported within the frame unit 11, the tongue being selectively adjustable in an operative and an inoperative position. The tongue includes a baseplate 18 that is fixable by a weld or the like to the supporting frame unit, the baseplate 18 being connected by means of a hinge 19 to a swingable plate 20, it being noted that the hinge 19 is positioned along a diagonal direction between the plates whereby when the swingable plate 20 is pivoted, the same changes 90° in direction at the same time.

The plate 20 includes an upward extending U-shaped portion 21 which is receivable within a space 22 formed between angle irons 15, one of the bars 14, and one of the sides of the frame 12.

Adjacent to portion 21 there is a terminal extension 23 upon which there is positioned a spherical configurated connection post 24 over which the boom of a trailer may be secured.

The tongue 17 is securable in either of the positions shown in FIGS. 6 and 7 by means of a mechanism 26 upon the underside of the terminal portion 23, the mechanism 26 including a control knob 27 upon a shaft 28 for the purpose of manually activating a cable 29 for selectively rotating a lock mechanism drive shaft 30 upon the underside of which there is located a gear 31.

As shown in FIG. 5 of the drawings, the gear 31 engages a pair of toothed racks 32 upon slideable bars 33 that are moveable inwardly and outwardly through opening 34 within each sideplate 35 of an enclosed housing 36, the tapered ends 37 of the bars 33 accordingly engaging opening 38 or 39 in the bars 34 or angle irons 15 of the intercross respectively, depending on the assumed position of the tongue.

Thus the tongue may be rigidly supported in either of the positions. The knob shaft 28 may include a detent ball engageable within a corresponding depression of a stationary member for selectively locking the shaft 28 from rotating unless desired.

In operative use, the hideaway trailer hitch may be secured to any desirable position or portion of the rear end of an automobile, depending upon the particular contour of the automobile model. Thus in some instance, the same may be secured to the bumper frame, automobile chassis frame or the underside of the trunk compartment.

As is shown in FIG. 8 of the drawing, the automobile 42 is shown carrying the hideaway trailer hitch 10 mounted upon the underside thereof and shown in solid lines the tongue 17 in an extended position, and showing in phantom lines the tongue 17 in a retracted position during which time the tongue is thus hidden away from view and does not detract from the asthetic appearance of the automobile.

What I now claim is:

1. In a hideaway trailer hitch, the combination of a frame unit and a hitch tongue, said frame unit comprising a rectangular frame and an intercross, said intercross fitted within said frame and comprising a pair of spaced bars parallel to one pair of sides of said frame and extending between the other pair of sides thereof, said bars intersecting a pair of spaced angle irons mounted parallel to said other pair of sides of the frame and extending between said one pair of sides of the frame, said angle irons having a central notch through which said bars extend, said frame and intercross rigidly supporting a swingable hitch tongue between operative and stored positions, said tongue having hinge means to swingably mount a rear portion of the tongue for movement between a rearwardly extending operative position in which the tongue portion extends along said pair of angle irons and also protrudes rearwardly of the frame unit and the vehicle on which the frame unit is adapted to be mounted so as to expose the hitch and a sidewardly extending position in which the tongue portion extends along said pair of bars in its stored position on the frame unit.

2. The combination as set forth in claim 1, wherein said tongue comprises a pair of plates, one of said plates being securable rigidly by means of bolts or weld to said frame unit, said plates of said tongue being connected together by means of a diagonally extending hinge, the other of said plates including an upward extending portion receivable between said angle irons of said intercross when said tongue is in its operative position, said tongue including an extending terminal portion having a spherically configurated post at the end thereof for securement to a boom of a trailer and said tongue terminal portion having a locking mechanism to selectively secure the tongue in its operative or stored position.

3. The combination as set forth in claim 2, wherein said locking mechanism includes a knob upon the upper side of said tongue terminal extension, said knob being mounted upon a shaft, a cable secured around said shaft and being connected to rotate a locking mechanism drive shaft carrying a gear, said gear engaging a pair of toothed racks upon a pair of rods, said rods being slideable upwardly of a pair of openings in opposite sidewalls of a locking mechanism housing, the terminal ends of said rods being tapered for selectively engaging a pair of openings in said bars or openings in said angle irons of said intercross.

* * * * *